(12) United States Patent
Ng et al.

(10) Patent No.: US 10,388,997 B2
(45) Date of Patent: Aug. 20, 2019

(54) METHOD AND APPARATUS FOR DISASSEMBLING AND SEPARATING COMPONENTS OF BATTERIES

(71) Applicant: CN Innovations Limited, Hong Kong (CN)

(72) Inventors: Ka Ming Ng, Hong Kong (CN); Ka Yip Fung, Hong Kong (CN); Lingda Xu, Hong Kong (CN)

(73) Assignee: CN INNOVATIONS LIMITED, Hong Kong (CN)

( * ) Notice: Subject to any disclaimer, the term of this patent is extended or adjusted under 35 U.S.C. 154(b) by 368 days.

(21) Appl. No.: 15/373,661

(22) Filed: Dec. 9, 2016

(65) Prior Publication Data
US 2018/0166752 A1  Jun. 14, 2018

(51) Int. Cl.
*H01M 10/54* (2006.01)
*H01M 10/0525* (2010.01)

(52) U.S. Cl.
CPC ....... *H01M 10/54* (2013.01); *H01M 10/0525* (2013.01); *Y02W 30/84* (2015.05)

(58) Field of Classification Search
None
See application file for complete search history.

(56) References Cited

U.S. PATENT DOCUMENTS

| 2009/0214933 A1* | 8/2009 | Sloop | H01M 10/052 429/49 |
| 2015/0118940 A1* | 4/2015 | Deighton | H01M 10/54 451/40 |

* cited by examiner

*Primary Examiner* — Wyatt P McConnell
(74) *Attorney, Agent, or Firm* — Nath, Goldberg & Meyer; Jerald L. Meyer

(57) ABSTRACT

A method and apparatus for safely dissembling lithium ion batteries and separating components thereof is provided. The apparatus includes a container having a top portion and a bottom portion. The top portion includes a cutter system. A load-in fixture is located at a central portion of the cutter system between the first cutter and the second cutter. After the lithium ion battery is securely fastened and each end of the lithium ion battery is cut, a pushing rod/bar extending transversely through a central axis of the cutting system is pushed through the core of the lithium ion battery. The separated components of the lithium ion battery are deposited in a cell components collection system in a bottom portion of the container. The cell cores are collected in a cell cores collection box and the metal casing and casing ends are collected in a metal casing and casing ends collection box.

20 Claims, 4 Drawing Sheets

METHOD AND APPARATUS FOR DISASSEMBLING AND SEPARATING COMPONENTS OF BATTERIES

FIELD

The present subject matter relates to the field of lithium ion batteries (LIBs), and more particularly to a method and apparatus for battery recycling of LIBs.

BACKGROUND

Rechargeable batteries are used in a variety of electronic devices, including portable computers, portable computer peripherals, personal digital assistants (PDAs), cellular phones, cameras, and electric vehicles. Because of the wide variety of uses for rechargeable batteries, a number of different rechargeable battery chemistries have been developed, each having certain advantages and disadvantages. Lithium ion batteries (LIBs) are rechargeable energy-storage devices that have become the rechargeable energy storage device of choice due to their improved efficiency. LIBs, unlike other secondary batteries, do not contain the metal components such as mercury, cadmium and lead, and are also characterized by having a sufficient cycle life. Hence the usage of the lithium ion secondary batteries is steadily increasing.

A typical LIB consists of a metal casing, a cathode, an anode, a separator, and electrolyte. The cathode consists of an active material such as lithium metal oxide coated on a metal foil, whereas the anode consists of an active material such as carbon coated on a metal foil. The separator is placed between a cathode layer and an anode layer, and is wound up to form the cell core. The cell core is inserted into a metal casing, followed by electrolyte injection to the cell before closing the battery with a cap. These batteries contain materials that are hazardous to both people and the environment. However, at the same time, LIBs are made from valuable materials that are often wasted or discarded. Since many LIBs are discarded after use, LIB waste is rapidly accumulating due to the growing market of electric devices and systems, in particular, electric vehicles. Solutions and strategies to cope with the substantial amount of spent LIBs are therefore in great demand. Among them, battery recycling is a viable solution not only for environmental concerns, but also for a sustainable life cycle of these materials whose global reserves are limited.

Before applying any chemical process (e.g. hydrometallurgical and pyrometallurgical processes) to extract the valuable materials such as cobalt, lithium, copper, etc., from batteries for reuse, batteries must first be safely disassembled, and various material components need to be carefully separated. Further, extreme care is required to handle the enclosed electrolyte of LIBs which is flammable and highly volatile. As such, a fully automatic system is needed to ensure safe operation and disassembly of separate components of LIBs with increased efficiency. Also, use of such an automatic system can avoid direct exposure of labor towards harmful and toxic chemicals in LIBs.

Thus, the present subject matter provides a novel method and apparatus for disassembling and separating parts of a LIB. The apparatus can accommodate LIBs of various forms and shapes, including cylindrical, prismatic, and pouch battery cells, among others. These are common battery forms used in industry which can be disassembled and separated by the present apparatus. The disclosed apparatus generally comprises a loading part, a battery holder, a cutter system, a cell core pusher, a water tank and cell components collection boxes, and allows for automatic disassembly and separation of various parts of a LIB.

SUMMARY

The present subject matter has been made in view of the above circumstances, and an object is to improve the recovery of valuable materials from spent LIBs. The present subject matter discloses a method and apparatus to disassemble LIBs using mechanical approaches to separate the metal casing and cell core of an LIB. Use of the present subject matter simplifies the process for separating components of LIBs, and also removes the labor for separating components of LIBs. The efficiency of drawing out the cell core is also increased because of the continuous and automatic processes provided by the present subject matter. Therefore, the present subject matter provides an efficient first step for the entire battery recycling process.

According to one embodiment of the present subject matter, an apparatus for safely dissembling LIBs and separating components thereof is provided. The apparatus includes a container having a top portion and a bottom portion. The top portion includes a cutter system comprising a first cutter and a second cutter on opposing sides. A load-in fixture is located at a central portion of the cutter system between the first cutter and the second cutter, wherein the load-in fixture is configured to receive one or more lithium ion batteries therein. In between the first and second cutter, there is a holder to securely fasten the battery for cutting. After the LIB is securely fastened by the holder and each end of the LIB is cut by each of the cutters, a pushing rod/bar extending transversely through a central axis of the cutter system is pushed through the core of the LIB. The separated components of the LIB are deposited in a cell components collection system in a bottom portion of the container. The cell components collection system includes a water tank with a plurality of collection boxes for collecting the separated components of the LIB.

According to another embodiment of the present subject matter, a method for safely dissembling LIBs and separating components thereof is provided. The method begins with loading one or more LIBs into a container. The LIBs are then secured between a first and second cutter within the container. Then, each end of the LIB is cut via the rotating members of the first cutter and second cutter. Subsequently, a cell core of the LIB is removed by pushing a rod/bar extending transversely through a central axis of the first cutter or the second cutter through the core of the LIB. The separated components of the LIB are collected in a cell components collection system located below the cutter system in the bottom portion of the container.

BRIEF DESCRIPTION OF THE DRAWINGS

Many aspects of the disclosure can be better understood with reference to the following drawings.

DETAILED DESCRIPTION

Figure 1:
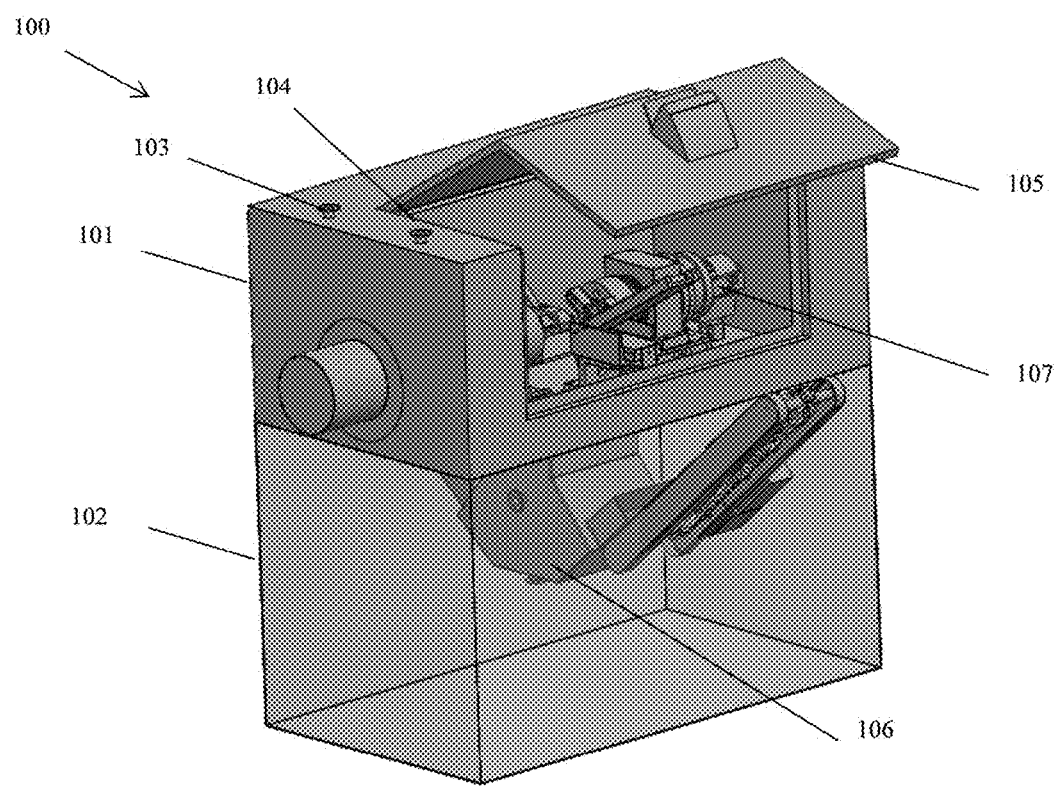
FIG. 1 shows a perspective view of an apparatus for disassembling LIBs according to one embodiment of the present subject matter.

Reference is now made in detail to the description of non-limiting embodiments as illustrated in the drawings. While the embodiments described may use specific materials or configurations, there is no intent to limit the subject matter to the embodiment or embodiments disclosed herein. Accordingly, various modifications to the embodiments presented may be readily apparent to those skilled in the art, and the generic principles described herein can be applied to other non-limiting embodiments without departing from the spirit or scope of the claimed subject matter. As such, this detailed description of various alternative embodiments should not be construed to limit the scope or breadth of the present apparatus, system and method as set forth in the claims.

The present subject matter is directed to an apparatus and method for disassembling lithium ion batteries (LIBs) by using mechanical processes to segregate the metal casing and cell core of the LIB. The method and apparatus of the present subject matter provides an efficient way of removing the cell core and metal casing of an LIB in a continuous and automatic process.

The apparatus of the present subject matter is capable of performing all processes required to open the metal casing of a LIB and collect the individual components of the LIB, regardless of shape or form. The apparatus comprises different parts, including an enclosed container having a cover, a loading part for receiving the LIBs, a cutter and pusher system, and a cell components collection system. All components and modules responsible for different functions are integrated into a single apparatus for a fully automated process.

As shown in FIG. 1, the apparatus for safely dissembling lithium ion batteries and separating components of a LIB comprises a container 100 having a top portion 101 and a bottom portion 102. The disassembling process is performed in an isolated and enclosed container 100 filled with inert gas (in the top portion 101) such as nitrogen, argon or other inert gas, in order to prevent the rapid reaction between air and electrolyte to avoid a risk of fire and explosion. The inert gas can be provided to the top portion 101 via an air inlet 103 and the gas in the top portion 101 can be purged from the container through the air exhaust 104. Before cutting the LIB, the top portion 101 of the container is purged with inert gas for a period sufficiently long to displace the gas inside the container with inert gas. The top portion 101 may further include a cover 105. The cover 105 acts as a window for quick access to the inside compartment when any repair is needed or any abnormal issue is observed inside the container 100. In some embodiments, the cover 105 includes a hinged door to selectively open and close the container to allow a user to access different parts of the container 100.

The bottom portion 102 of the container houses the cell components collection system 106. The cell components collection system 106 is in communication with the top portion such that the separated components of the LIB are received therein after cutting. The communication means between the top portion and the cells components collection system in the bottom portion is a hinged separation plate. In particular, the cell core and metal casing of the LIB will drop into the cell components collection system 106 in the bottom portion 102 of the container separately, as individual components of the LIB. A separation plate is disposed between the top portion and the bottom portion of the container to direct the cell cores, metals casing and casing ends to different collection boxes in the cell components collection system 106. The collection boxes that collect the separated parts of the LIB, i.e., the casing ends, the cell core or the metal casing, are placed in the water tank of cell components collection system 106 in the bottom portion for reacting or dissolving the electrolyte in the LIB.

A cutter and pusher system 107 is disposed in the top portion 101 of the container. The cutter system includes a first cutter and a second cutter on opposing sides of the top portion. A load-in fixture is located at a central portion of the cutter system between the first cutter and the second cutter. The load-in fixture is configured to receive one or more lithium ion batteries therein. In between the first and second cutter, there is a holder to securely fasten the battery for cutting. After the LIB is securely fastened and each end of the LIB is cut, a pushing rod/bar, extending transversely through a central axis of either the first cutter or the second cutter, is pushed through the cell core of the LIB. After the cell core is pushed out, the pushing rod/bar returns to a standby position. The separated components of the LIB are then deposited in the cell components collection system in the bottom portion of the container.

Figure 2:
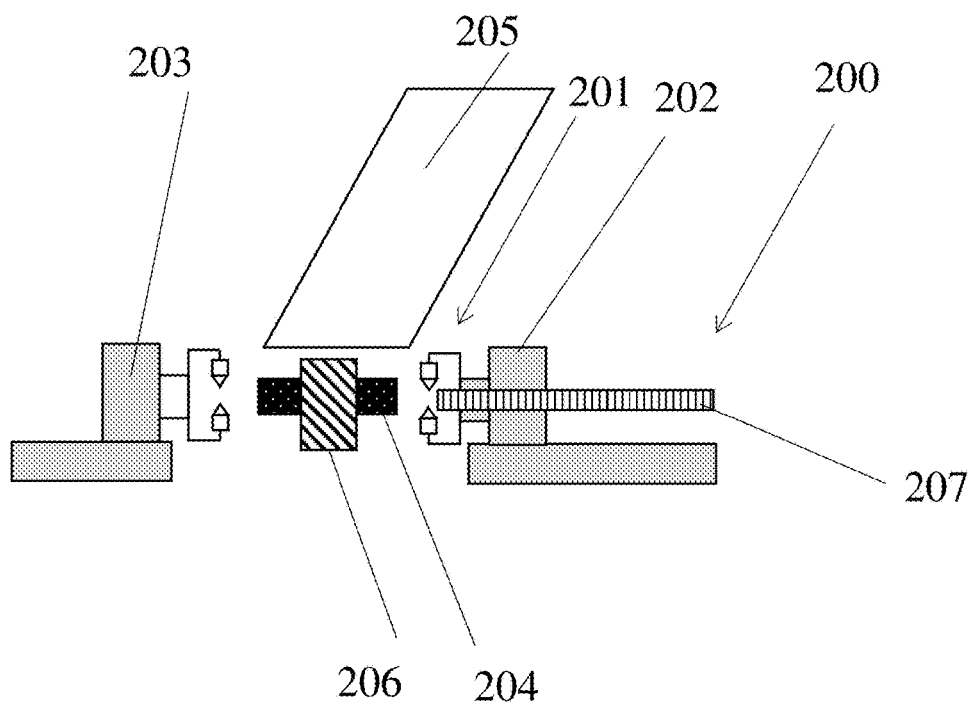
FIG. 2 shows a schematic diagram of a cutter and pusher system according to one embodiment of the present subject matter.

Referring now to FIG. 2 there is shown a cutter and pusher system 200 according to one embodiment of the present subject matter. The cutter and pusher system 200 is used to cut the two ends of the metal casing of the LIB and push out the cell core of the LIB. In this way, the cell core, the cut metal casing and the two casing ends of LIB will drop into the cell components collection system 106 in the bottom portion of the container separately, as individual components of the LIB.

The cutter and pusher system 200 is located in the top portion 101 of the container. In some embodiments the cutter system 201 comprises a first cutter 202 and a second cutter 203 on opposing sides of the top portion of the container. The cutter system 201 is a device designed to cut each end of the metal casing of the LIB. For example, the cutter system 201 can be a knife, a needle, a serrated edge, a water jet, an electrical discharge machine, a water discharge machine or a laser. A LIB 204 enters the top portion of the container via a load-in fixture 205 that is located at a central portion of the cutter and pusher system 200 between the first cutter 202 and the second cutter 203. The load-in fixture 205 is configured to receive one or more lithium ion batteries therein. The LIB 204 enters the top portion 101 of the container via a window in the cover onto the load-in fixture 205. The LIB is then provided to a battery holder 206 via the ramp of the load-in fixture which extends from the window of the cover to the battery holder 206. After loading the LIB 204, the battery holder 206 extends from its standby position to securely fasten the LIB 204 between the first cutter 202 and the second cutter 203. After the LIB 204 is securely fastened in the battery holder 206, each end of the LIB 204 is cut.

The cutter and pusher system 200 further includes a pushing rod/bar 207 extending transversely through a central axis of the cutter system 201. The pushing rod/bar 207 extends from either the first cutter 202 or the second cutter 203. The pushing rod/bar 207 is pushed through the core of the LIB to remove the cell core therefrom. The separated cell core of the LIB is deposited in the cell components collection system in the bottom portion of the container. After the cell cores are pushed out of the metal casing, the battery holder 206 is released. The first cutter 202, second cutter 203 and battery holder 206 return to their standby positions. The metal casing and the two casing ends are deposited in the cell components collection system in the bottom portion of the container.

According to one embodiment, the cutter and pusher system 200 is a one-piece device that implements a series of processes to disassemble the LIBs. Untreated LIBs are initially placed in the queue at the load-in fixture 205. The LIBs 204 are then provided to a battery holder 206 one by one from the load-in fixture 205 and are then fixed into position by the battery holder 206 such as clips. The top side of each battery faces the first cutter 202, while the bottom of the battery faces the second cutter 203. The two ends of the battery are cut by each of the cutters. Then the pushing rod/bar 207 goes forward to push the cell core out of the metal casing and the cell core drops into the cell components collection system. The first cutter 202, second cutter 203 and the battery holder 206 then return to their standby positions. The metal casing and the two casing ends drop to the cell components collection system. A separation plate is placed between the top portion and the bottom portion of the container to direct the cell cores and metal casing and casing ends to different collection boxes in the cell components collection system.

Figure 3:
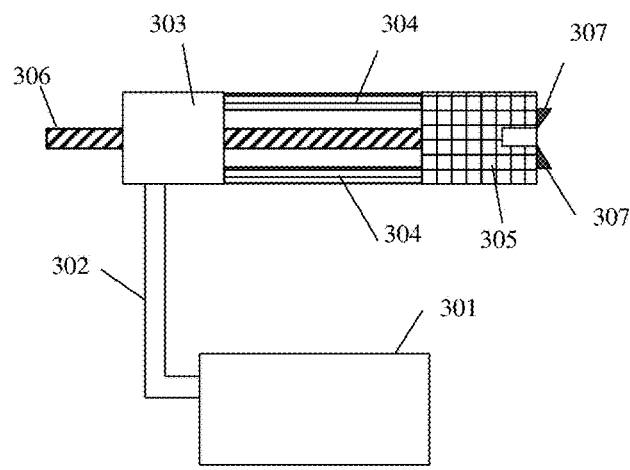
FIG. 3 shows a schematic diagram of a process mechanism of the cutter and pusher system according to one embodiment of the present subject matter.

FIG. 3 shows a schematic diagram of a process mechanism of the cutter and pusher system according to one embodiment of the present subject matter. Both the first cutter and the second cutter each include a hydraulic pump 301, a connecting tube 302, a cylinder 303, draw pipe 304 and a power chuck 305. The hydraulic pump unit 301 connects to a cylinder 303 by a connecting tube 302. The hydraulic pump 301 drives the cylinder 303. The cylinder 303, in turn, drives the draw pipe 304 and moves the draw pipe forward. The draw pipe 304 connects the cylinder 303 to a power chuck 305. In one embodiment, the right power chuck moves forward by the draw pipe and clips the top side of the battery. At the same time, the left power chuck moves forward by the draw pipe and clips the bottom of the battery. The cutters 307 on the power chuck 305 touch the edge of the metal casing and undergo a rotation motion to cleave the ends of the metal casing. The rotation motion is designed for cutting cylindrical cells. Similar cutting methods can be used for batteries of different shapes and forms. For example, a round-the-battery cutting can be used for prismatic battery. Similarly, other types of cutting motions are contemplated for cutting the ends of batteries of various shapes. The two casing ends of the LIB are then cut and segregated from the metal casing. The draw pipes 304 move backward and take the casing ends out of the metal casing. The pushing rod/bar 306 moves forward to push the cell core into the cell components collection system.

Figure 4:
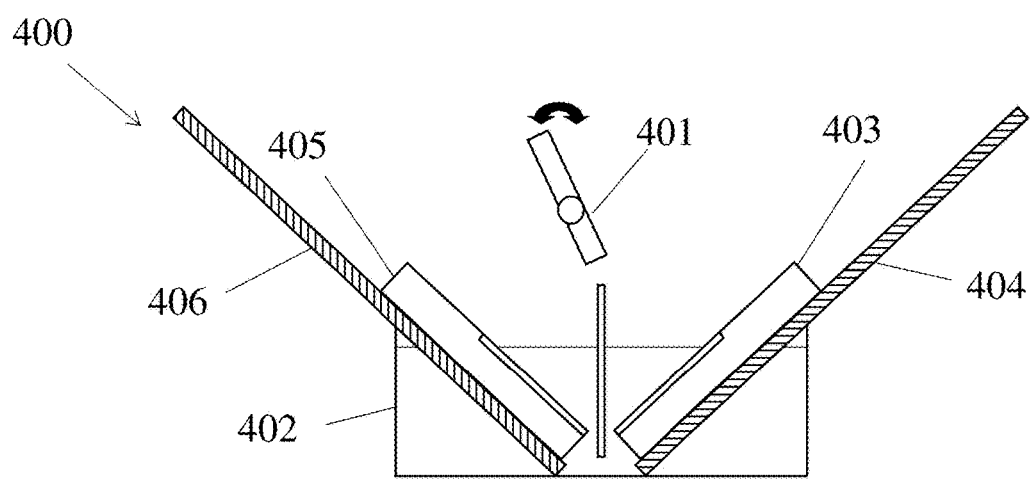
FIG. 4 shows a schematic diagram of a cell components collection system according to one embodiment.

Referring now to FIG. 4, there is shown a schematic diagram of collecting the parts of a battery in the cell components collection system 400 according to another embodiment. The cell components collection system comprises a separation plate 401, a water tank 402, one or more cell cores collection boxes 403, a cell cores collection box transportation mechanism 404, one or more metal casing and casing ends collection boxes 405, and a metal casing and casing ends collection box transportation mechanism 406. In this embodiment, the cell core is pushed by the pusher in the cutter and pusher system 200 and dropped into the cell cores collection box 403 in the water tank 402. Afterwards, the separation plate 401 switches to another side. The separation plate 401 allows the water tank 402 to communicate with the top portion of the container such that it can receive the disassembled components of the LIB in the corresponding collection box in the water tank 402. The two casing ends released by the power chucks described in FIG. 3 and the metal casing released by the battery holder are subsequently dropped into the metal casing and casing ends collection box 405 in the water tank 402. In this respect, the one or more collection boxes can house the cell cores in one collection box 403 and the metal casing and casing ends in another collection box 405. The water tank 402 can be filled with an electrolytic solution, an organic solvent, water, an alkali solution, or combinations thereof, for complete reaction or dissolution of electrolyte in the metal casing and the cell core. When the collection boxes are full, the cell cores collection box 403 can be transferred outside for further treatment by the cell cores collection box transportation mechanism 404, whereas the metal casing and casing ends collection box 405 can be transferred outside for further treatment by the metal casing and casing ends collection box transportation mechanism 406. The transportation mechanism can be a conveyor belt or a similar transportation mechanism. The waste electrolyte solution of the LIB can be collected in the water tank 402.

Figure 5:
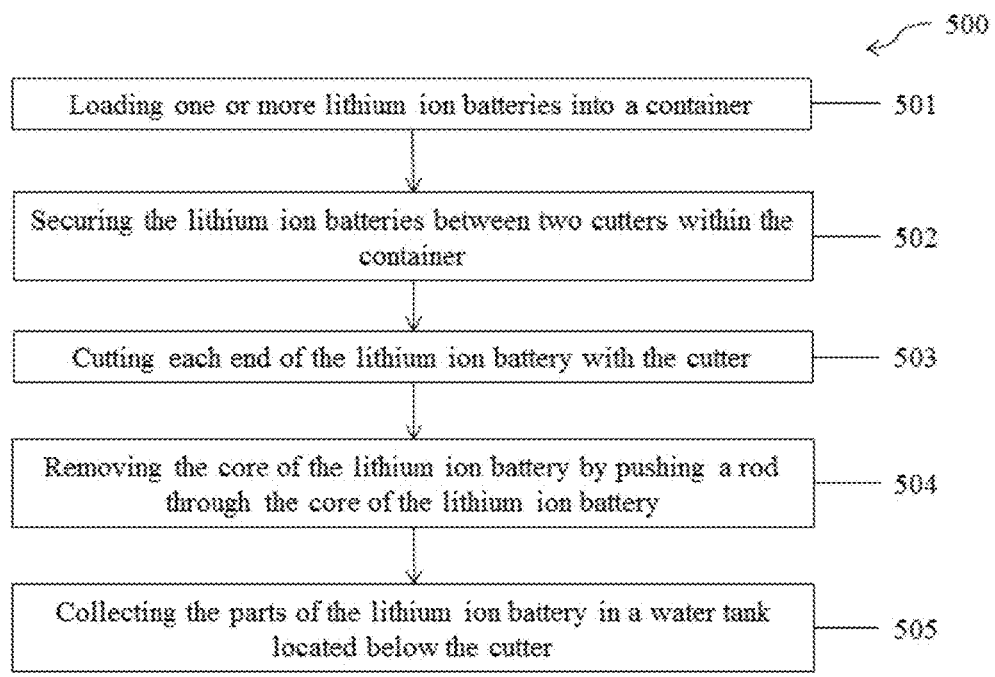
FIG. 5 shows a flowchart of a method for disassembling LIBs according to one embodiment of the present subject matter.

As provided in FIG. 5, another non-limiting embodiment of the present subject matter provides a method 500 for safely dissembling LIBs and separating components thereof. The method 500 begins by loading 501 one or more LIBs into a container. In loading step 501, one or more LIBs are placed onto a load-in fixture configured to receive one or more LIBs therein. The load-in fixture comprises a ramp extending from the outside of the cover to a battery holder for providing the LIB within the container.

After loading step 501, the method continues to securing step 502. At securing step 502, the LIBs are secured between a cutting apparatus within the container. The cutter system includes a first cutter and a second cutter on opposing sides of the container and the LIB is secured there between. The LIBs are fixed into position by fasteners such as clips, clamps, magnets, vacuum, among other fastening means.

After securing step 502, the method continues to cutting step 503. At cutting step 503, each end of the metal casing of the LIB is cut by the first cutter and second cutter. In some embodiments, the top side of each battery faces the first cutter, while the bottom of the battery faces the second cutter, and each end is cut accordingly. Then, after cutting step 503, the method continues to removing step 504. At removing step 504, the cell core of the LIB is removed by pushing a rod/bar extending transversely through a central axis of the first cutter through the core of the LIB. In other words, the pusher goes forward from one end of the cutter (the first or second cutter) to push the cell core out of the metal casing and drops the cell core into the cell components collection system.

After removing step 504, the method continues to collecting step 505. At collecting step 505, the parts of the LIB are collected in a water tank located below the cutter system. After the LIB is separated into cell core, metal casing and casing ends; the components are collected in the collection boxes in a water tank. Preferably, all cell cores of the LIBs are sorted into a cell cores collection box and the remaining parts are sorted into a metal casing and casing ends collection box.

In the above described embodiments, the design and arrangement of the apparatus and method disclosed illustrate examples of the possible forms of a product where the present subject matter is implemented. This process and manner do not impose any limit or restriction to the scope of battery products.

The disclosure provided herein fully describes the method and apparatus for safely dissembling lithium ion batteries and separating components thereof in such clear and concise terms as to enable those skilled in the art to understand and practice the same, and the generic principles described herein can be applied to other embodiments without departing from the spirit or scope of this disclosure. Thus, it is to be understood that the description and drawings presented herein represent a presently preferred embodiment of the subject matter and are therefore representative of the subject matter which is broadly contemplated by the present disclosure.

EXAMPLE

Figure 6:
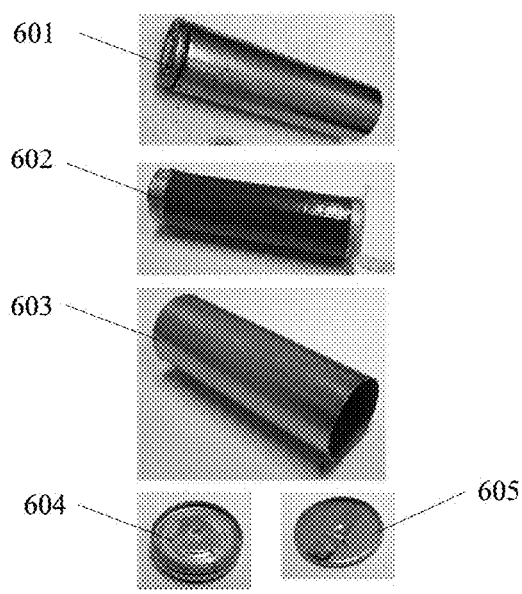
FIG. 6 shows the separated components of the LIB according to one embodiment of the present subject matter.

LIB 601 as shown in FIG. 6 was separated into metal casing and cell core in this example. The LIBs were put in a load-in fixture. One LIB was loaded to the battery holder. The first and second cutter moved in to cut both ends of the LIB. After the ends were cut, the pushing rod/bar was moved forward to push the cell core out of the metal casing. The cell core was dropped into the cell cores collection box. The separation plate was switched to another position. The cutters and the battery holder were released to drop the metal casing and casing ends into the metal casing and casing ends collection box. The collection boxes were placed in a water tank to dissolve or react the electrolyte with water. The collection boxes were then transferred out of the container. The cell core 602 was collected from the cell cores collection box, whereas the metal casing 603, casing ends 604, 605 were collected from the metal casing and casing ends collection box. The whole cycle time of cutting a LIB was around 30 s.

What is claimed is:

1. An apparatus for safely dissembling lithium ion batteries and separating components thereof, comprising:
    a container including a top portion and a bottom portion;
    a cutter system disposed in the top portion of the container, the cutter system comprising a first cutter and a second cutter on opposing sides of the top portion;
    a load-in fixture located at a central portion of the cutter system between the first cutter and the second cutter, the load-in fixture configured to receive one or more lithium ion batteries therein;
    a pushing rod/bar extending transversely through a central axis of the first cutter or the second cutter; and
    a cell components collection system in the bottom portion of the container, wherein the cell components collection system is in communication with the top portion.

2. The apparatus of claim 1, further comprising a battery holder located at a terminal end of the load-in fixture, wherein the battery holder is configured to secure the one or more lithium ion batteries between the first cutter and second cutter.

3. The apparatus of claim 2, wherein the battery holder is selected from the group consisting of clips, clamps, magnets, and vacuum.

4. The apparatus of claim 1, wherein the top portion of the container is filled with an inert gas.

5. The apparatus of claim 4, wherein the inert gas is selected from the group consisting of nitrogen, argon and other noble gases.

6. The apparatus of claim 1, wherein the cell components collection system comprises a water tank and a plurality of cell components collection boxes.

7. The apparatus of claim 6, wherein a fluid in the water tank is selected from the group consisting of water, an organic solvent, an electrolytic solution, and an alkaline solution.

8. The apparatus of claim 1, wherein the cell components collection system comprises at least a cell cores collection box, a metal casing and casing ends collection box, a cell core transportation mechanism, and a metal casing and casing ends transportation mechanism.

9. The apparatus of claim 8, wherein the transportation mechanism is a conveyor belt.

10. The apparatus of claim 1, further comprising a cover on the top portion of the container, the cover comprising a hinge member configured to selectively open and close the cover.

11. The apparatus of claim 1, wherein the cutter system is selected from the group consisting of a knife, a needle, a serrated edge, a water jet, an electrical discharge machine and a laser.

12. The apparatus of claim 1, wherein the communication means between the top portion and the cells components collection system in the bottom portion is a hinged separation plate.

13. The apparatus of claim 1, wherein the top portion further comprises an air inlet and an air exhaust.

14. The apparatus of claim 1, wherein the first cutter and second cutter each comprise:
    a hydraulic pump;
    a cylinder operatively connected to the hydraulic pump;
    a draw pipe extending from the cylinder to a power chuck;
    wherein the power chuck drives the first cutter and the second cutter to cut each end of the one or more lithium ion batteries.

15. A method for safely dissembling lithium ion batteries and separating components thereof, the method comprising:
    loading one or more lithium ion batteries into a container;
    securing the lithium ion batteries within a cutter system within a top portion of the container, the cutter system comprising a first cutter and a second cutter on opposing sides of the container;
    cutting each end of the lithium ion battery with the first cutter and second cutter;
    removing a core of the lithium ion battery by pushing a rod/bar extending transversely through a central axis of the first cutter or the second cutter through the core of the lithium ion battery; and
    collecting separated parts of the lithium ion battery in a cell components collection system located below the cutter in a bottom portion of the container.

16. The method of claim 15, wherein the cell components collection system comprises a water tank and a plurality of cell components collection boxes, wherein the separated parts of the lithium ion battery are collected in one or more collection boxes within the water tank of the cell components collection system.

17. The method of claim 15, wherein the top portion of the container is filled with an inert gas.

18. The method of claim 15, wherein the lithium ion battery is fixed in position by a battery holder.

19. The method of claim 18, wherein the battery holder is selected from the group consisting of clips, clamps, magnets, and vacuum.

20. The method of claim 16, further comprising filling the water tank with a solution selected from the group consisting of water, an organic solvent, an electrolytic solution, and an alkaline solution.

* * * * *